US005529758A

United States Patent [19]

Houston

[11] Patent Number: 5,529,758
[45] Date of Patent: Jun. 25, 1996

[54] THREE-BED ROTARY VALVE AND FUME INCINERATION SYSTEM

[76] Inventor: Reagan Houston, 252 Foxhunt La., Hendersonville, N.C. 28739

[21] Appl. No.: 441,394

[22] Filed: May 15, 1995

[51] Int. Cl.⁶ .............................. F01N 3/08; F16K 11/00; F27D 17/00
[52] U.S. Cl. .......................... 422/171; 422/176; 137/312; 137/625.46; 137/625.47; 251/304; 432/182
[58] Field of Search ............................... 137/312, 625.46, 137/625.47; 123/190.1; 251/304; 422/171, 176; 432/180–182

[56] References Cited

U.S. PATENT DOCUMENTS

| | | |
|---|---|---|
| 3,045,692 | 7/1962 | Reynolds et al. . |
| 3,166,098 | 1/1965 | Jennings ..................... 137/625.47 X |
| 3,211,534 | 10/1965 | Ridgway . |
| 3,306,171 | 2/1967 | Gordon ....................... 137/625.47 X |
| 3,634,026 | 1/1972 | Kuechler et al. . |
| 3,870,474 | 3/1975 | Houston . |
| 3,927,693 | 12/1975 | Johnston .......................... 137/625.47 |
| 4,126,419 | 11/1978 | Katabuchi et al. . |
| 4,280,416 | 7/1981 | Edgerton . |
| 4,454,826 | 6/1984 | Benedick . |
| 4,543,996 | 10/1985 | Baron . |
| 4,574,842 | 3/1986 | Córdova ........................ 137/625.46 |
| 4,726,391 | 2/1988 | Barra ............................ 137/625.47 X |
| 5,000,422 | 3/1991 | Houston . |
| 5,016,547 | 5/1991 | Thomason . |
| 5,217,041 | 6/1993 | Houston . |
| 5,375,622 | 12/1994 | Houston . |

FOREIGN PATENT DOCUMENTS 62-72967  4/1987  Japan ..................... 251/304

Primary Examiner—Timothy M. McMahon
Assistant Examiner—E. Leigh Dawson
Attorney, Agent, or Firm—Carter & Schnedler

[57] ABSTRACT

A three-bed regenerative fume incinerator system includes a single rotary fluid control valve which effects three operational cycles in a repeating sequence. A valve body has a cylindrical inner surface about a central axis. Six main conduit connection openings at 60° angular intervals are organized as three regenerator connection openings and three interspersed functional connection openings. The regenerator connection openings are connected via conduits to the lower end of the three respective thermal regenerators, the upper ends of which are connected to a common combustion chamber. Respectively connected to the functional connection openings are a contaminated feed gas inlet, treated gas outlet, and a source of purge gas. A valve rotor within the body has a pair of generally parallel plates spaced apart a distance corresponding to the angular extent of the openings, and supported substantially equidistant from the central axis for rotation between three functional valve positions. When the valve rotor is in any one of the functional valve positions, the parallel plates define a first path between the plates for deliberate fluid communication between two diametrically opposed main conduit connection openings, a second path on the outside of one of the plates for deliberate fluid communication between two adjacent main conduit connection openings, and a third path on the outside of the other one of the plates for deliberate fluid communication between another two adjacent main conduit connection openings.

19 Claims, 12 Drawing Sheets

THREE-BED ROTARY VALVE AND FUME INCINERATION SYSTEM

BACKGROUND OF THE INVENTION

The present invention relates generally to incinerator systems for the abatement of process emissions and, more particularly, to a three-bed regenerative fume incinerator system including a simplified valving arrangement for the control of hot gas flow to and from the beds of a regenerative incinerator.

Process emissions often contain combustible contaminants that, if released to the atmosphere, have the potential of polluting the environment. More particularly, noxious fumes, waste gas or process emissions generally contain contaminants in the form of volatile organic combustibles (VOCs).

However, the amount of combustible material contained in these emissions is generally below the concentration required to ignite or propagate a flame at ambient temperature. Accordingly, incinerators are employed to treat the process emissions by increasing the temperature of such process emissions to a temperature above the ignition temperature of the contaminants therein so as to oxidize the contaminants.

For increased efficiency, a regenerative incinerator system may be employed. Regenerative preheating increases the overall efficiency of the incinerator by minimizing the amount of fuel required to raise the process emissions to ignition temperature.

More particularly, as disclosed in Houston U.S. Pat. No. 3,870,474, and now commonly employed, an advantageous regenerative incinerator system has three regenerative beds, connected to a common combustion chamber. Each regenerative bed is filled with a suitable packing material, such as a multiplicity of heat retaining ceramic saddles. By means of appropriate valving to achieve three different operation cycles which sequentially and continuously repeat at intervals, the system is operated such that each bed, at different times, is a feed bed, a purge bed, and an exhaust bed. At any given time, gas flow in a three-bed regenerative incinerator system is such that hot gas from the combustion chamber heats the exhaust bed, while the feed bed (which previously was the exhaust bed) preheats incoming process emissions directed into the combustion chamber, and the purge bed (which previously was the feed bed) is purged into the combustion chamber.

As disclosed in Houston U.S. Pat. No. 3,870,474, having three beds in a regenerative incinerator system allows one bed to be a purge bed to avoid the leakage of even small amounts of untreated gas into the atmosphere. There do exist two-bed regenerative incinerator systems wherein the two beds alternate between the feed bed and the exhaust bed function, with the disadvantage that untreated gas remaining in the feed bed is exhausted to the atmosphere when gas flow through the beds reverses and the feed bed becomes the exhaust bed. Three-bed incinerators avoid this disadvantage, as the feed bed becomes the purge bed during the next operation cycle, with gas flow in that particular bed continuing in the same direction, towards the combustion chamber.

It will be appreciated that a suitable valving arrangement is required to control the gas flow and thus effect the operation cycles whereby the functions of the three regenerative beds are changed. It will further be appreciated that demanding requirements are placed on flow control valves in a regenerative incinerator application. The valves must be relatively large to handle a high volume of hot gas flow, and further must operate over a typical incinerator temperature range of 50° F. to 1,000° F. (10° C. to 538° C.), with attendant thermal expansion and contraction considerations.

The above-referenced Houston U.S. Pat. No. 3,870,474 discloses a system employing three three-way valves and three two-way (open or closed) valves, for a total of six valves. A more common arrangement, such as is disclosed in Houston U.S. Pat. Nos. 5,000,422 and 5,217,041 employs a total of nine two-way valves. Current commercial practice is to employ the nine two-way valve configuration, organized as six large power-operated two-way valves for controlling feed gas into and treated gas out of the three beds, and three medium-size power-operated two-way valves for controlling purge gas flow. The six large power-operated two-way valves in particular are expensive, and represent a significant portion of the total cost of a regenerative fume incinerator system. Moreover, a relatively complex control system must be provided to operate the nine valves at proper times and in an appropriate sequence to change the operation cycles at intervals.

A number of approaches to reducing the cost of valving for three-bed regenerative incinerators have been proposed in the prior art, but without apparent success in commercial practice. Examples are disclosed in Kuechler U.S. Pat. No. 3,634,026, Katabuchi et al U.S. Pat. No. 4,126,419, Edgerton U.S. Pat. No. 4,280,416, Benedict U.S. Pat. No. 4,454,826, and Thomason U.S. Pat. No. 5,016,547.

SUMMARY OF THE INVENTION

Accordingly, it is an object of the invention to provide simplified and reduced-cost valving for a three-bed regenerative fume incinerator.

It is another object of the invention to provide a valving arrangement which avoids problems with valve leakage notwithstanding clearances provided to accommodate thermal expansion and contraction.

It is another object of the invention to provide a valve suitable for hot gas flow wherein clearances are readily adjustable.

It is yet another object of the invention to provide a valving arrangement for three-bed regenerative incinerators which is simple to control.

Very briefly, in accordance with the invention a rotary valve having six conduit connections and a simple rotor replaces the nine valves commonly employed in three-bed regenerative incinerator systems.

More particularly, a rotary fluid control valve in accordance with one aspect of the invention has a valve body with a central axis. In general the valve body has an inner surface defined as a surface of revolution of a line about the axis. Typically, the inner surface is generally cylindrical, and may be a tapered cylinder. In one form, the valve body has a pair of end walls, and a generally cylindrical inner surface, preferably in the form of a tapered cylinder for clearance adjustment purposes, extending between the end walls about the central axis.

Six main conduit connection openings are provided at substantially equal angular intervals about the central axis, preferably extending through the generally cylindrical inner surface. The openings are organized as three regenerator connection openings and three interspersed functional connection openings.

Within the valve body is a valve rotor, which includes a pair of generally parallel plates spaced apart a distance at least sufficient to span the angular extent of the openings, and preferably a distance corresponding to the angular extent of the openings. The parallel plates are supported substantially equidistant from the central axis for rotation on the central axis between at least three valve positions. Radially outer edges of the parallel plates are adjacent to the inner surface in any one of the valve positions.

In a more particular embodiment, the valve rotor includes a pair of circular end pieces centered and mounted for rotation on the central axis. The circular end pieces are oriented perpendicularly to the central axis, with the peripheries thereof adjacent the inner surface, and the pair of generally parallel plates extend between the end pieces. The circular end pieces are-axially spaced from respective ones of the end walls to define internal end chambers.

When the valve rotor is in any one of the valve positions, the parallel plates define a first path between the plates for deliberate fluid communication between two diametrically opposed main conduit connection openings, a second path on the outside of one of the plates for deliberate fluid communication between two adjacent main conduit connection openings, and a third path on the outside of the other one of the plates for deliberate fluid communication between another two adjacent main conduit connection openings.

As another aspect of the invention, a thermal regenerative fume incinerator system has, in addition to a rotary fluid control valve as summarized above, three thermal regenerators each functioning alternately to receive heat from a gas flow passing through the regenerator in one direction, and to transfer heat to a gas flow passing through the regenerator in the opposite direction. The system also has an inlet for untreated feed gas, an outlet for treated gas, and a source of purge gas. A combustion chamber common to all three regenerators is connected to a first (upper) end of each of the regenerators for receiving a preheated feed gas flow passing through one of the regenerators, oxidizing contaminants in the preheated gas flow, and discharging hot exhaust gas through another one of the regenerators.

Second (lower) ends of the regenerators are connected to respective ones of the regenerator connection openings of the valve, the feed gas inlet is connected to one of the functional connection openings of the valve, the treated gas outlet is connected to another one of the functional connection openings, and the source of purge gas is connected to the remaining one of the functional connection openings.

As noted in the background discussion hereinabove, a fluid control valve for a regenerative incinerator is relatively large and moreover is subject to thermal expansion. As a result, it is not feasible to provide extremely close tolerances which could essentially eliminate valve leakage in the space between the radial outer edges of the parallel plates and the adjacent valve inner surface.

In accordance with another aspect of the invention, the valve rotor includes structure cooperating with portions of the valve body inner surface and with at least portions of the outside surfaces of the plates to define plenums when the valve rotor is in any of the valve positions. The plenum-defining structure has edges adjacent the inner surface of the valve body angularly spaced from the radially outer edges of the parallel plates, preferably a distance sufficient to span an adjacent one of the openings when the valve rotor is in a position intermediate the valve positions. The valve further includes a minor conduit, which may either be pressurized or vented, in fluid communication with the plenum at least when the valve rotor is in any of the valve positions.

In one form, the minor conduit comprises an aperture in at least one of the circular end pieces between the plenum and the corresponding internal end chamber, and the end chamber is in turn connected to a source of pressure or venting.

BRIEF DESCRIPTION OF THE DRAWINGS

While the novel features of the invention are set forth with particularity in the appended claims, the invention, both as to organization and content, will be better understood and appreciated, from the following detailed description taken in conjunction with the drawings, in which:

DETAILED DESCRIPTION

Figure 1:
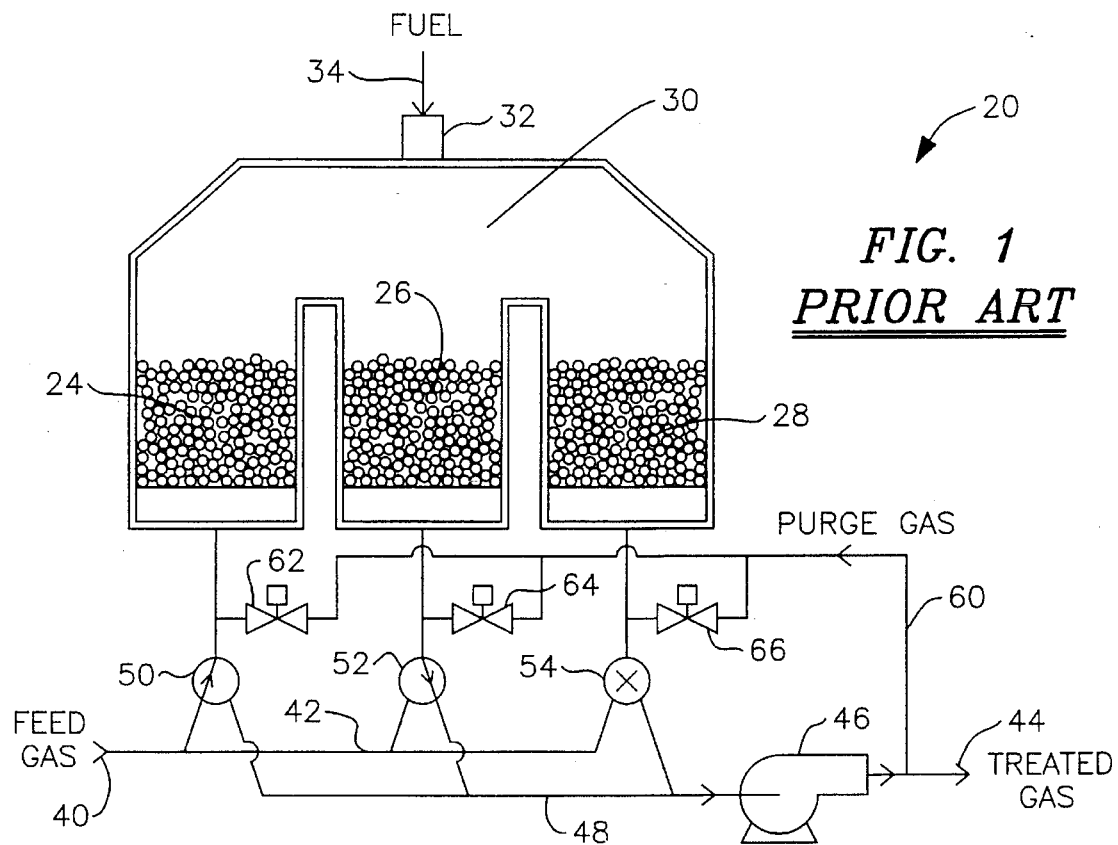
FIG. 1 is a highly schematic diagram of a prior art three-bed regenerative fume incinerator system implemented with three three-way valves and three two-way valves.

Referring first to FIG. 1, schematically depicted is a prior art three-bed regenerative fume incinerator system 20 such as is disclosed in Houston U.S. Pat. No. 3,870,474. The incinerator system 20 has three conventional regenerative beds 24, 26 and 28 connected to a common combustion chamber 30. The combustion chamber 30 has a burner 32 and a fuel, such as natural gas, is supplied to the burner 32 as indicated by arrow 34.

The incinerator system 20 additionally includes a feed gas inlet 40 supplying a common feed gas line 42, and a treated gas outlet 44 driven by a blower 46 having a common suction line 48 connected to its inlet.

For controlling main gas flow through the incinerator beds 24, 26 and 28, there are three large three-way valves 50, 52 and 54 which selectively connect the lower ends of the regenerator beds 24, 26 and 28 either to the common feed gas line 42 (e.g. valve 50); to the suction line 48 (e.g. valve 52); or block main gas flow (e.g. valve 54). It will be appreciated that the valves 50, 52 and 54 are represented in a highly schematic manner, and the symbols employed are not intended to represent internal structure of the valves 50, 52 and 54.

In overview, as thus far described, during operation of the prior art regenerative incinerator system 20 of FIG. 1 process emissions containing volatile organic combustibles (VOCs) are introduced, preferably at a pressure below atmospheric pressure, into the system 20 via the feed gas inlet 40, and treated gas is carried away from the incinerator system 20 via the treated gas outlet 44. The valves 50, 52 and 54 are appropriately operated, employing suitable power actuators and controls (not shown), to control the direction and source of gas flows through the incinerator beds 24, 26 and 28 to effect the three operational cycles. In the particular valve configuration and operational cycle represented in FIG. 1, feed gas from inlet 40 is directed through valve 50 upwardly through incinerator bed 24, which functions as a preheat bed, having previously been an exhaust bed in the previous operational cycle. Combustion occurs within the combustion chamber 30, and hot combustion exhaust gas flows downwardly through the bed 26, which functions as an exhaust bed, through valve 52, through suction line 48 and through blower 46 to exhaust at 44.

Additionally, and as disclosed in Houston U.S. Pat. No. 3,870,474, there is a common purge gas supply line 60, which in this example is tapped off of the treated gas output of the blower 46, for purging whichever one of the regenerator beds 24, 26 and 28 was previously functioning as the feed bed in order to minimize the possibility of even small amounts of untreated feed gas escaping the system 20. Purge gas flow is controlled by a set of three relatively smaller two-way (open or closed) valves 62, 64 and 66 connected between the purge gas line 60 and respective lower ends of the incinerator beds 24, 26 and 28. The purge gas valves 62, 64 and 66 likewise are appropriately operated, employing suitable power actuators and controls, to purge the beds 24, 26 nd 28 when required in accordance with a particular operational cycle.

Figure 2:
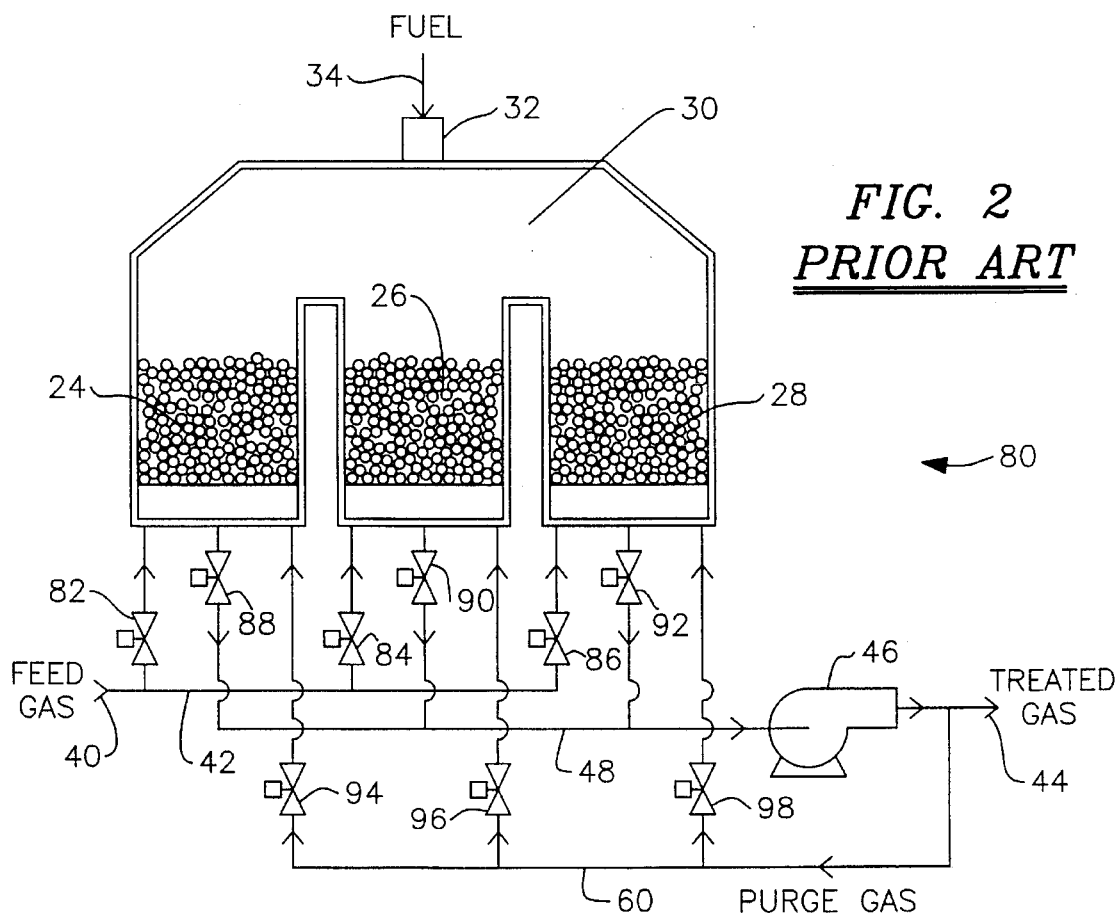
FIG. 2 is a similar highly schematic diagram of another three-bed regenerative fume incinerator system implemented with nine two-way valves.

FIG. 2 represents another prior art regenerative incinerator system 80, which employs nine two-way valves, such as is disclosed in Houston U.S. Pat Nos. 5,000,422 and 5,217, 041. In practice, the valve arrangement of FIG. 2 with nine two-way valves is less expensive to implement than the arrangement of FIG. 1 with three three-way valves and three two-way valves, and accordingly is more commonly employed.

The system 80 of FIG. 2 includes the same three regenerator beds 24, 26 and 28 as in FIG. 1 as well as the common combustion chamber 30, the burner 32 and fuel supply 34. Again, feed gas is introduced at inlet 40 into common feed gas line 42, and treated gas exits at 44 driven by blower 46, which draws from common suction line 48.

In the system 80 of FIG. 2, each of the three large three-way valves 50, 52 and 54 in the system 20 of FIG. 1 is replaced by a pair of relatively large two-way (open or closed) valves for selectively connecting the lower ends of the beds 24, 26 and 28 to either the feed gas supply line 42 or the suction line 48. Thus, valves 82, 84 and 86 are provided for selectively connecting common feed gas line 42 to the respective regenerator beds 24, 26 and 28; and valves 88, 90 and 92 are provided for respectively connecting the regenerator beds 24, 26 and 28 to suction line 48. The purge gas line 60 is connected through relatively smaller valves 94, 96 and 98 to lower ends of the regenerative beds 24, 26 and 28. It will be appreciated that the purge gas valves 94, 96 and 98 in FIG. 2 correspond generally to the purge gas valves 2, 64 and 66 in FIG. 1. All nine valves 82, 84, 86, 88, 90, 92, 94, 96 and 98 are appropriately operated, employing suitable power actuators and controls, to sequentially effect the three operational cycles as described hereinabove.

As also noted hereinabove, the six large power-operated valves 82, 84, 86, 88, 90 and 92 in particular are expensive, and represent a significant portion of the total cost of a fume incinerator. Moreover, individual actuators and a suitable control system or sequencer must be provided.

Figure 3A:
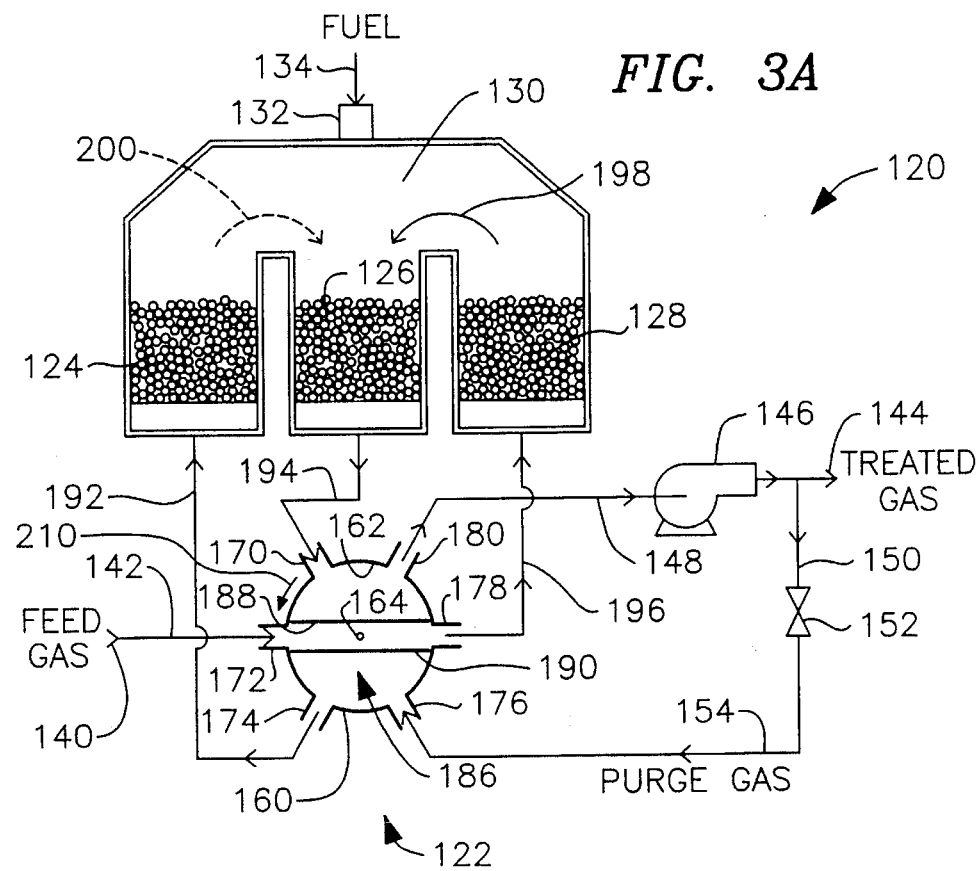
FIGS. 3A, 3B and 3C are highly schematic diagrams of a three-bed regenerative fume incinerator system incorporating a rotary fluid control valve in accordance with the invention, respectively showing three different operation cycles.
Figure 3B:
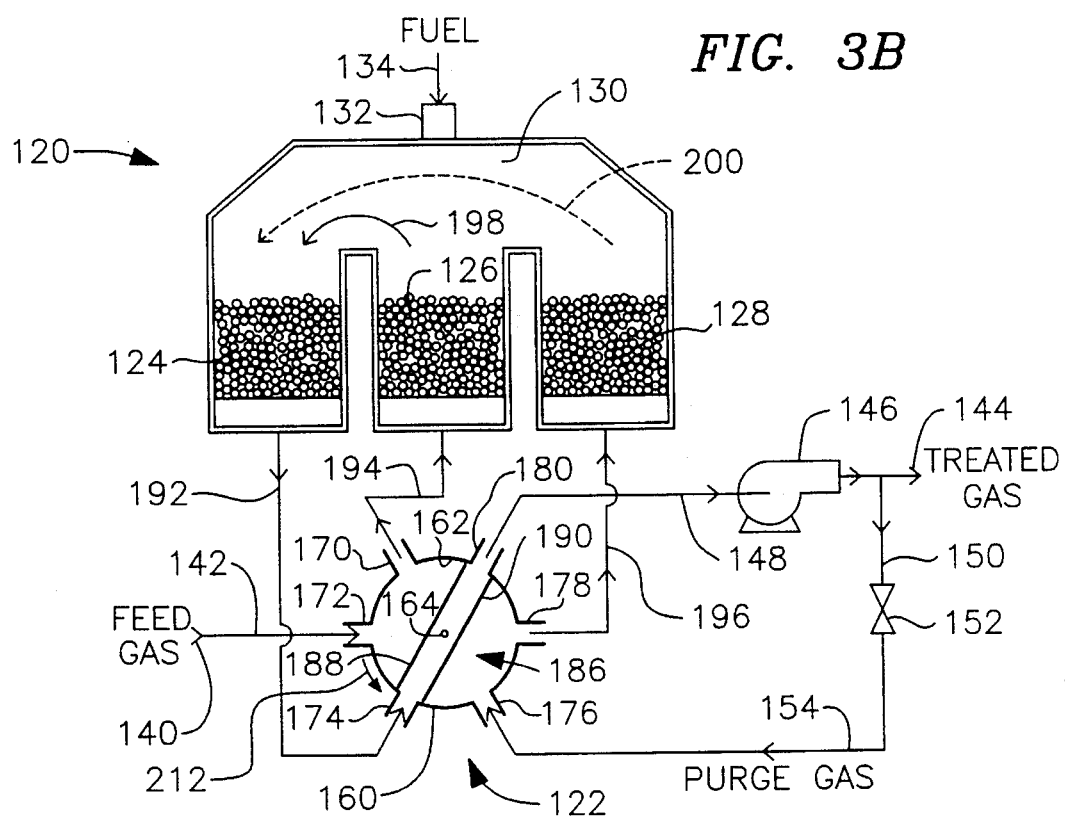
Figure 3C:
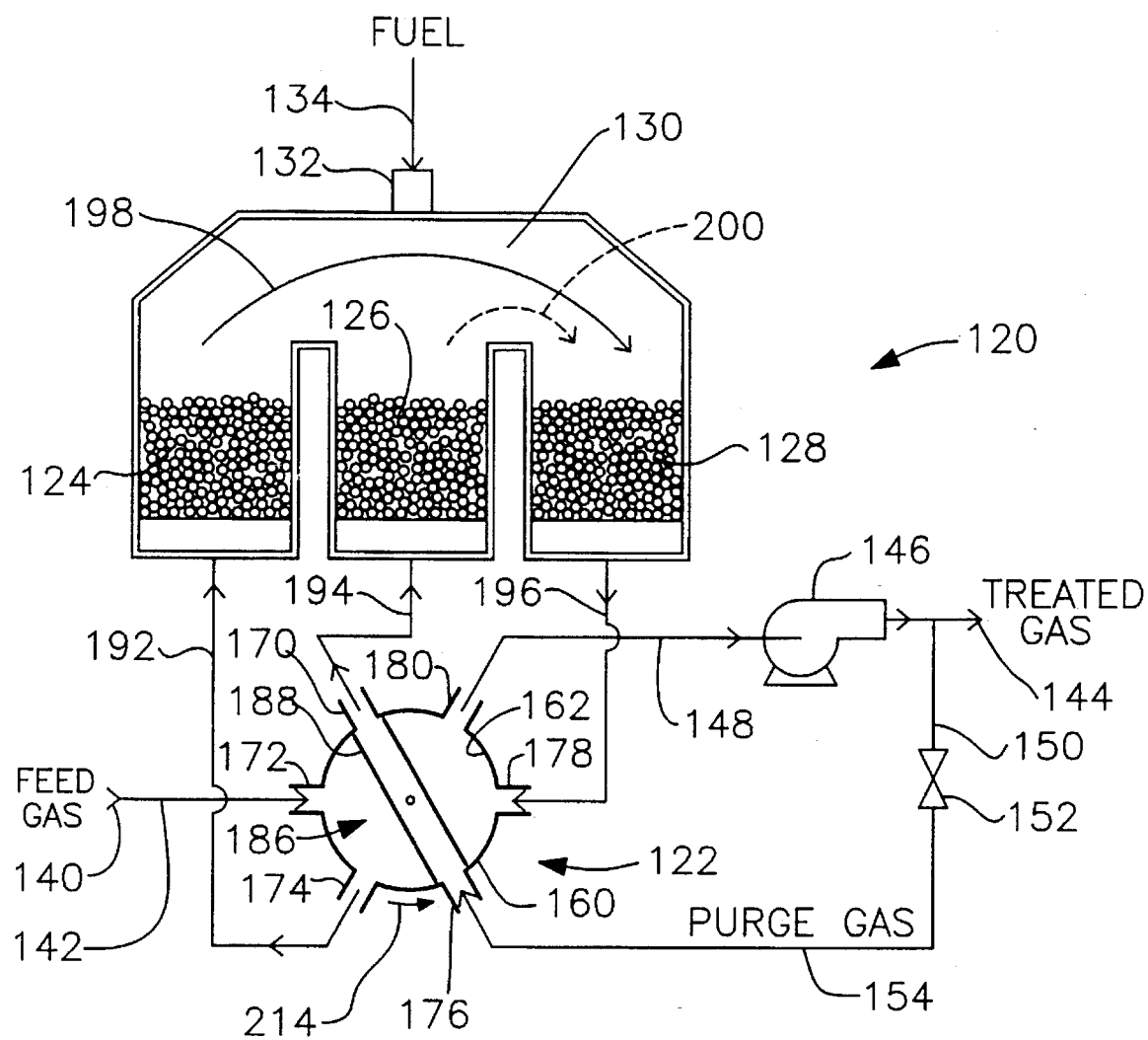

With reference now to FIGS. 3A, 3B and 3C, a regenerative incinerator system 120 including a rotary valve 122 in accordance with the invention is represented in somewhat schematic fashion during three different operational cycles, with arrows indicating the direction of gas flow for the respective operational cycles. The incinerator system 120 includes three regenerative beds 124, 126 and 128 corresponding to the regenerative beds 24, 26 and 28 in FIGS. 1 and 2, as well as a common combustion chamber 130, a burner 132 and a fuel supply 134, likewise corresponding to elements 30, 32 and 34 respectively in the prior art incinerators 20 and 80 of FIGS. 1 and 2.

An inlet 140 for untreated feed gas is connected to a supply line or conduit 142, and an outlet 144 for treated gas is connected to the output of a blower 146 drawing from a suction line 148. For supplying purge gas, a line or conduit 150 is tapped of the output of the blower 146, and is connected through an adjustable restrictor valve 152 (employed, for example, for controlling the purge flow rate) to supply a purge gas line or conduit 154.

The rotary fluid control valve 122 more particularly for convenience of construction has a cylindrical valve body 160 with an inner surface 162 about a central axis 164, which axis 164 is perpendicular to the page in the orientation of FIGS. 3A, 3B and 3C. The valve body 160 additionally includes six main conduit connection openings 170, 172, 174, 176, 178 and 180 spaced at substantially equal angular intervals around the central axis 164. Other valve body configurations may be employed, such as spherical, and the inner surface 162 may more generally be described as a surface of revolution of a line (not necessarily a straight line) about the axis 164.

Within the valve body 160 is a valve rotor, generally designated 186, which includes a pair of generally parallel plates 188 and 190. The generally parallel plates 188 and 190 are substantially equidistant from the central axis 164, and are spaced apart a distance at least sufficient to span the angular extent of the openings 170, 172, 174, 176, 178 and 180. Preferably the distance between the generally parallel plates corresponds to the angular extent of the openings 170, 172, 174, 176, 178 and 180.

The rotor 186 including the parallel plates 188 and 190 rotates on the central axis 164 between at least three valve positions, which are 60° apart, in order to define various paths for deliberate fluid communication through the valve 122 depending upon the rotor 186 position. It will be appreciated that there actually are six different valve positions; however, valve positions which are 180° apart from each other are functionally indistinguishable.

For convenience of description, the main conduit connection openings 174, 170 and 178 are herein termed regenerator connection openings and are respectively connected to lower ends of the regenerator beds 124, 126 and 128 through respective lines or conduits 192, 194 and 196. The three remaining main conduit connection openings 172, 176 and 180, which are interspersed with the regenerator connection openings 170, 174 and 178, are for convenience of description herein termed functional connection openings. The feed gas inlet 140 is connected through line or conduit 142 to functional connection opening 172, the treated gas outlet is connected (stated in an order opposite the gas flow direction) through blower 146 and suction line 148 to functional connection opening 178, and the purge gas line or conduit 154 is connected to function connection opening 176.

Considering the operation in greater detail, during the operational cycle represented in FIG. 3A, bed 124 is functioning as the purge bed, (having been the feed bed during the previous operational cycle), bed 126 is functioning as the exhaust bed (having been the purge bed during the previous operational cycle), and bed 128 is functioning as the feed bed (having been the exhaust bed during the previous operational cycle).

Thus, in FIG. 3A feed gas from the inlet 140 enters the valve 122 via connection opening 172, and flows between the generally parallel plates 188 and 190, which thus define a first path for deliberate fluid communication through the valve 122, to emerge at diametrically opposed connection opening 178. Feed gas then flows through conduit 196 upwardly through regenerative bed 128 (functioning as the feed bed) which preheats the feed gas prior to combustion within the combustion chamber 130. As represented by arrow 198, what may be viewed as a main gas flow into or within the combustion chamber 130 is from the feed bed 128 to the exhaust bed 126. Hot combustion exhaust gas flow passes downwardly through the bed 126, preheating the bed 126, and then flows through conduit 194 into the valve 122 via conduit connection opening 170.

In FIG. 3A, a second path for deliberate fluid communication through the valve 122 is defined on the outside of the plate 188 between the adjacent main conduit connection openings 170 and 180. Exhaust gas, after preheating the bed 126, thus passes from the opening 170 through the valve 122, out opening 180 into suction line or conduit 148, to exit from the system 120 as treated gas at 144.

By means of a third path for deliberate fluid communication through the valve 122 in FIG. 3A, purge gas (which is treated gas at a relatively low flow volume) flows from purge gas line or conduit 154 into conduit connection opening 176 and out through conduit connection opening 174, through the third path for deliberate fluid communication which is defined on the outside of the plate 190. Purge gas from opening 174 then flows through line or conduit 192 and upwardly through bed 124 (which was the feed bed during the previous operational cycle) to purge untreated gas remaining in the bed 124. In what may be viewed as a secondary gas flow into or within the combustion chamber 130, represented by arrow 200, any remaining contaminants in the bed 124 are oxidized within the combustion chamber 130, and flow is generally into the bed 126 (functioning as the exhaust bed).

It will be appreciated that switching between the configurations of 3A, 3B and 3C representing three different cycles is accomplished by rotation of the rotor 186 from one valve position to the next, as indicated in FIG. 3A by arrow 210, which represents counterclockwise (for example) rotation of the rotor 186 an angular distance of 60° from its previous position (corresponding to FIG. 3C described hereinbelow).

With reference now to FIG. 3B, arrow 212 indicates counterclockwise (for example) rotation of the rotor 186 from the position of FIG. 3A. In changing from the operational cycle of FIG. 3A to that of FIG. 3B, it will be appreciated that bed 124 changes its function from the purge bed to the exhaust bed, bed 126 changes its function from the exhaust bed to the feed bed, and bed 128 changes its function from the feed bed to the purge bed. Thus, proper operation of the three-bed regenerative incineration is maintained as described in the above-referenced Houston U.S. Pat. No. 3,870,474.

Moreover, as the rotor 186 is changing positions between the orientations of FIG. 3A and 3B, (with the exception of leakage past the clearance spaces at the edges of the parallel plates 188 and 190) no momentary gas flows occur which could undesirably release even small amounts of untreated feed gas to the treated gas output stream.

Briefly, in the orientation of FIG. 3B, the first path for deliberate fluid communication through the valve 122 is established between diametrically opposed main conduit connection openings 174 and 180 whereby exhaust gas from the bed 124 (which is being preheated) passes through line or conduit 192 passes into opening 174, between the parallel plates 188 and 190, out through conduit connection opening 180, and through the blower 146 to emerge as treated gas 144. The second path for deliberate fluid communication through the valve 122 is established on the outside of the plate 188 between adjacent main conduit connection openings 172 and 170. Feed gas from inlet 140 passes into the valve 122 through conduit connection opening 172, out through conduit connection opening 170, and through line or conduit 194 and then upwardly through bed 126, functioning as the feed bed. The third path in FIG. 3B for deliberate fluid communication through the valve 122 is established between adjacent main conduit connection openings 176 and 178, on the outside of the plate 190. Purge gas from line or conduit 154 passes into the valve 122 through conduit connection opening 176, emerging through opening 178 and then passes through line or conduit 196 upwardly through bed 128, which functions as the purge bed. Thus, in FIG. 3B, bed 126 functions as the feed bed, while bed 128 functions as the purge bed, and bed 124 functions as the exhaust bed. Main gas flow within the combustion chamber 130 between the feed bed 126 and the exhaust bed 124 is represented by arrow 198, and secondary gas flow within the combustion chamber 130 between the purge bed 128 and the exhaust bed 124 is indicated by the arrow 200.

Referring to FIG. 3C, for this operational cycle the rotor 122 has rotated counterclockwise (for example) 60° as represented by arrow 214 to establish a first path for deliberate fluid communication through the valve 122 between diametrically opposed main conduit connection openings 176 and 170, a second path for deliberate fluid communication through the valve 214 between adjacent main conduit connection openings 172 and 174, and a third path for deliberate fluid communication through the valve 122 between adjacent main conduit connection openings 178 and 180. Thus, in FIG. 3C, bed 124 functions as the feed bed, bed 126 functions as the purge bed, and bed 128 functions as the exhaust bed. Main gas flow within the combustion chamber 130 between the feed bed and the exhaust bed is represented by arrow 198, and secondary gas flow within the combustion chamber 130 between the purge bed and the exhaust bed is indicated by the arrow 200.

For the next cycle of operation, the rotor 186 again rotates counterclockwise (for example) 60° to a position functionally equivalent to that of FIG. 3A, and the cycle continues.

Accordingly, from the operational description with reference to FIGS. 3A, 3B and 3C, it will be appreciated that the single rotary control valve 122 properly directs gas flows through the regenerator beds 124, 126 and 128 as the rotor 186 is rotated to the various valve positions to establish the repeating sequence of operational cycles. Thus, the one valve 122 of FIGS. 3A, 3B and 3C replaces either the six valves in the system 20 of FIG. 1 or the nine valves in the system 80 of FIG. 2.

Figure 13:
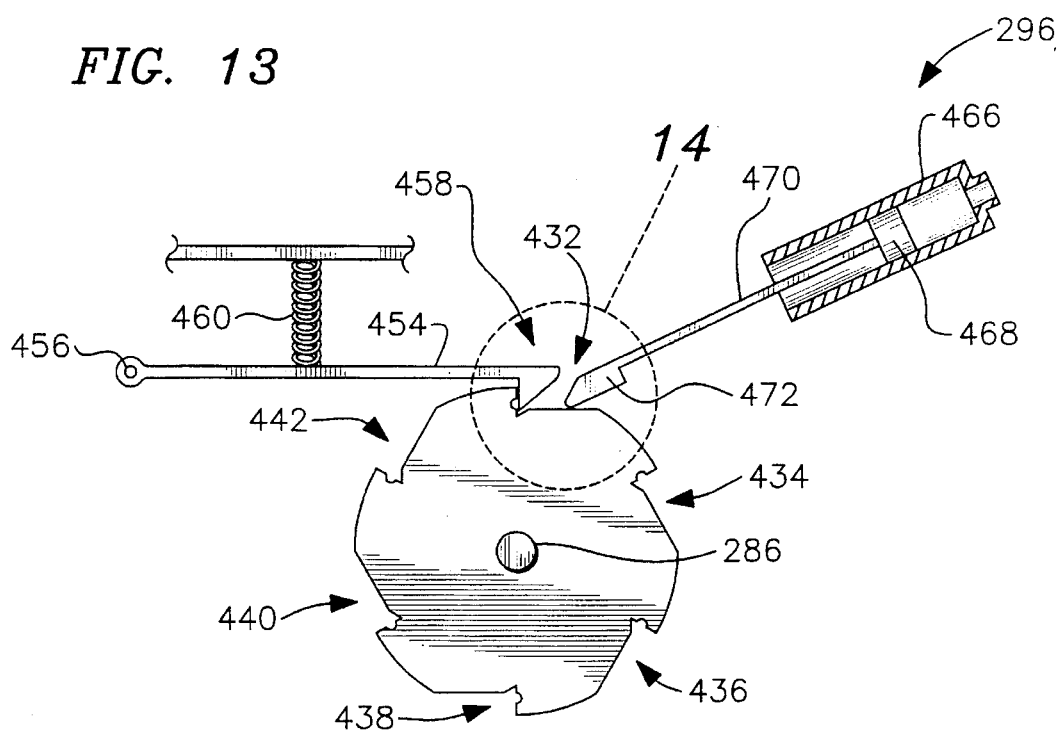
FIG. 13 is a view of an indexing mechanism for operating a rotary valve in accordance with the invention.
Figure 14:
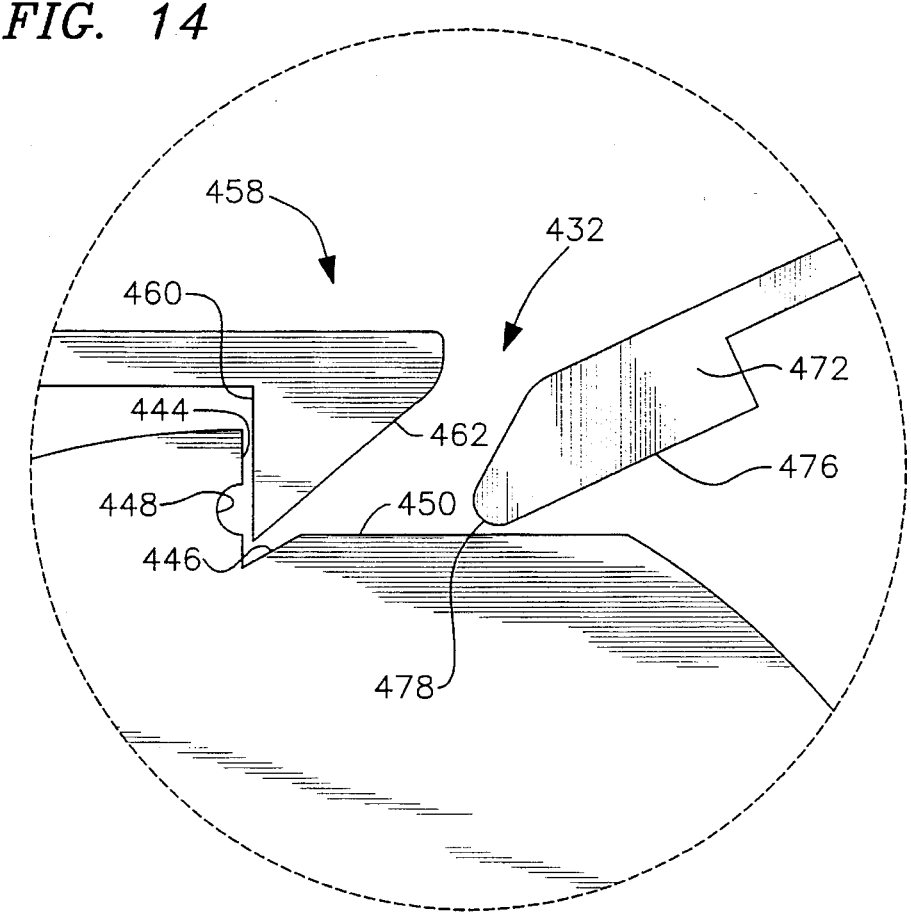
FIG. 14 is an enlarged view of a portion of the mechanism of FIG. 13.

Described hereinbelow with reference to FIGS. 13 and 14 is a simple control system in the form of an indexing mechanism for conveniently effecting periodically 60° counterclockwise rotation of the valve rotor 186 to establish the successive operational cycles, avoiding the need for a more complex control system or sequence such as is required for the nine-valve configuration of prior art FIG. 2.

Figure 4:
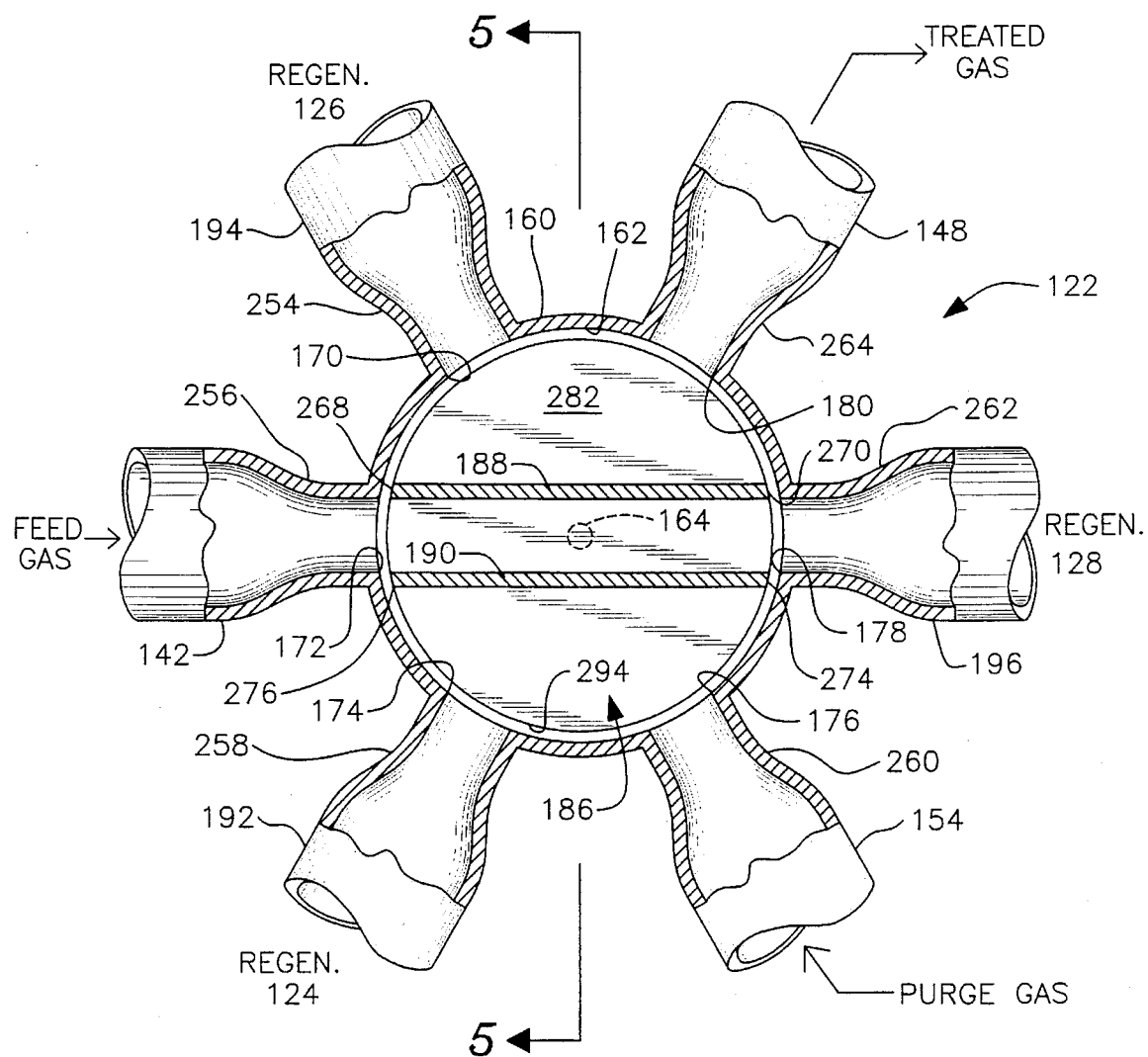
FIG. 4 is a more detailed cross-sectional view of the rotary valve shown schematically in the system of FIGS. 3A, 3B and 3C.
Figure 5:
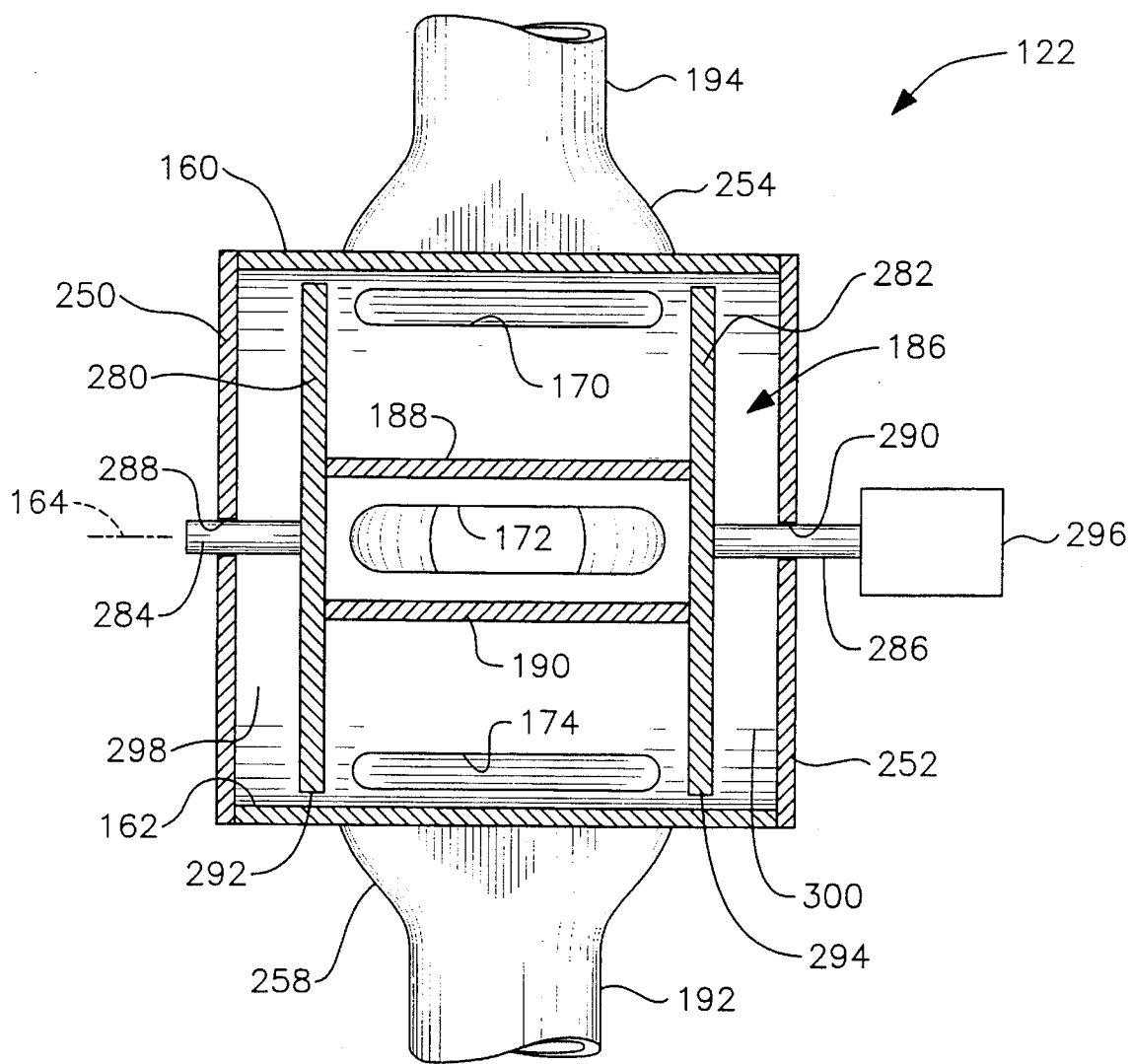
FIG. 5 is a section taken on line 5—5 of FIG. 4.
Figure 6:
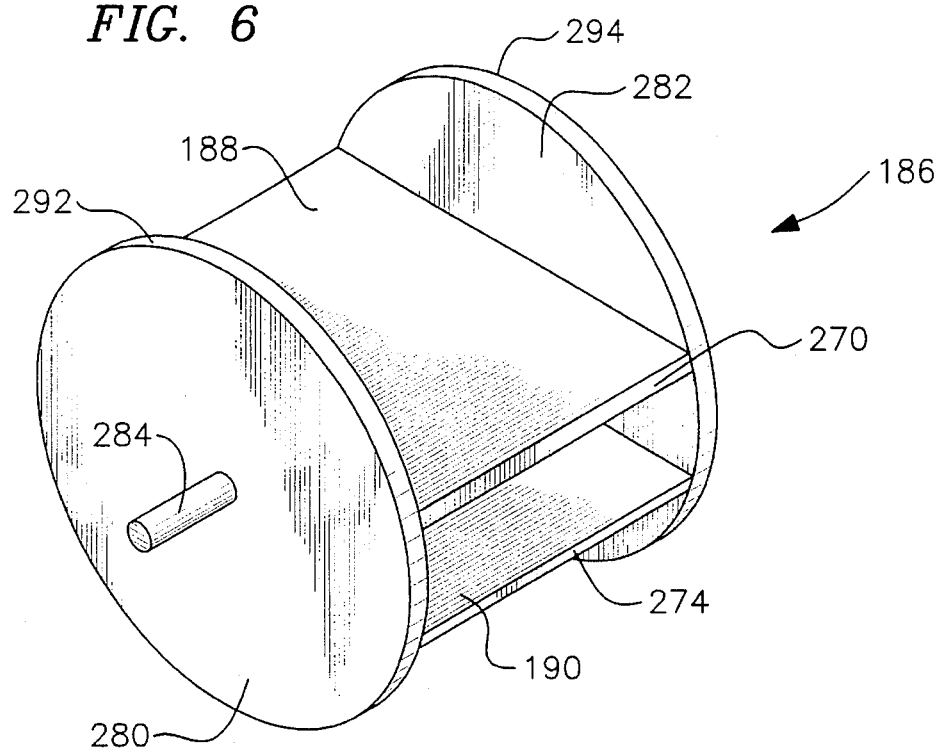
FIG. 6 is a three-dimensional view of the rotor of the valve of FIGS. 4 and 5.

With reference now to FIGS. 4, 5 and 6, the valve 122 of FIGS. 3A, 3B and 3C is shown in greater detail. In FIG. 4, the valve 122 is in the same orientation as in FIG. 3A. FIG. 5 is a section on line 5—5 of FIG. 4, and FIG. 6 is a three-dimensional view of the rotor 186. A typical valve housing 160 diameter (FIG. 4 orientation) is eight feet, and a typical valve housing 160 axial length (FIG. 5 orientation) is eight feet.

In the embodiment FIGS. 4 and 5, the valve body 160 more particularly comprises a pair of spaced apart end walls 250 and 252 generally perpendicular to the central axis 164, with the generally cylindrical inner surface 162 extending between the end walls 250 and 252. In FIG. 5, three of the main conduit connection openings 170, 172 and 174 are visible, which openings 170, 172 and 174 are oblong in this particular embodiment. The various conduits or ducts 142, 148, 154, 192, 194 and 196 connected to the valve 122 are, for example, about four feet in diameter, and are connected via transition sections 254, 256, 258, 260, 262 and 264 to the various openings 170, 172, 174, 176, 178 and 180, which are approximately two feet by eight feet. In order to maintain a cylindrical shape, the valve body 160 may require added support. Accordingly, support rods (not shown) streamlined in cross-section may span the openings 170, 172, 174, 176, 178 and 180 in a circumferential direction.

As best seen in FIG. 4, the generally parallel plates 188 and 190 have radially outer edges 268, 270, 274 and 276 that are adjacent, but slightly spaced from, the valve inner surface 162 when the valve rotor 186 is in any of the valve positions where deliberate fluid communication paths are established through the valve 122. In a preferred construction, the generally parallel plates 188 and 190 are rectangular.

The valve rotor 186 in a preferred construction more particularly includes a pair of circular end pieces 280 and 282 mounted for rotation the axis 164, and more particularly on axles 284 and 286 extending through corresponding bearing apertures 288 and 290 in the end walls 250 and 252. The circular end pieces 280 and 282 are oriented perpendicularly to the central axis 164, with the peripheries 292 and 294 thereof adjacent to but spaced from the valve inner surface 162. Advantageously, the generally parallel plates 188 and 190 extend between the rotor end pieces 280 and 282, and are supported thereby. As best seen in FIG. 5, the circular end pieces 280 and 282 of the rotor 186 are axially spaced from the end walls 250 and 252 to define a pair of internal end chambers 298 and 300.

As shown in FIG. 5, connected to the shaft 286 is an indexing mechanism 296 for control purposes, described hereinbelow in detail with reference to FIGS. 13 and 14. Very briefly, the indexing mechanism 296 periodically effects a 60° rotation of the valve rotor 186, at intervals of typically from thirty to one hundred eighty seconds.

Figure 7:
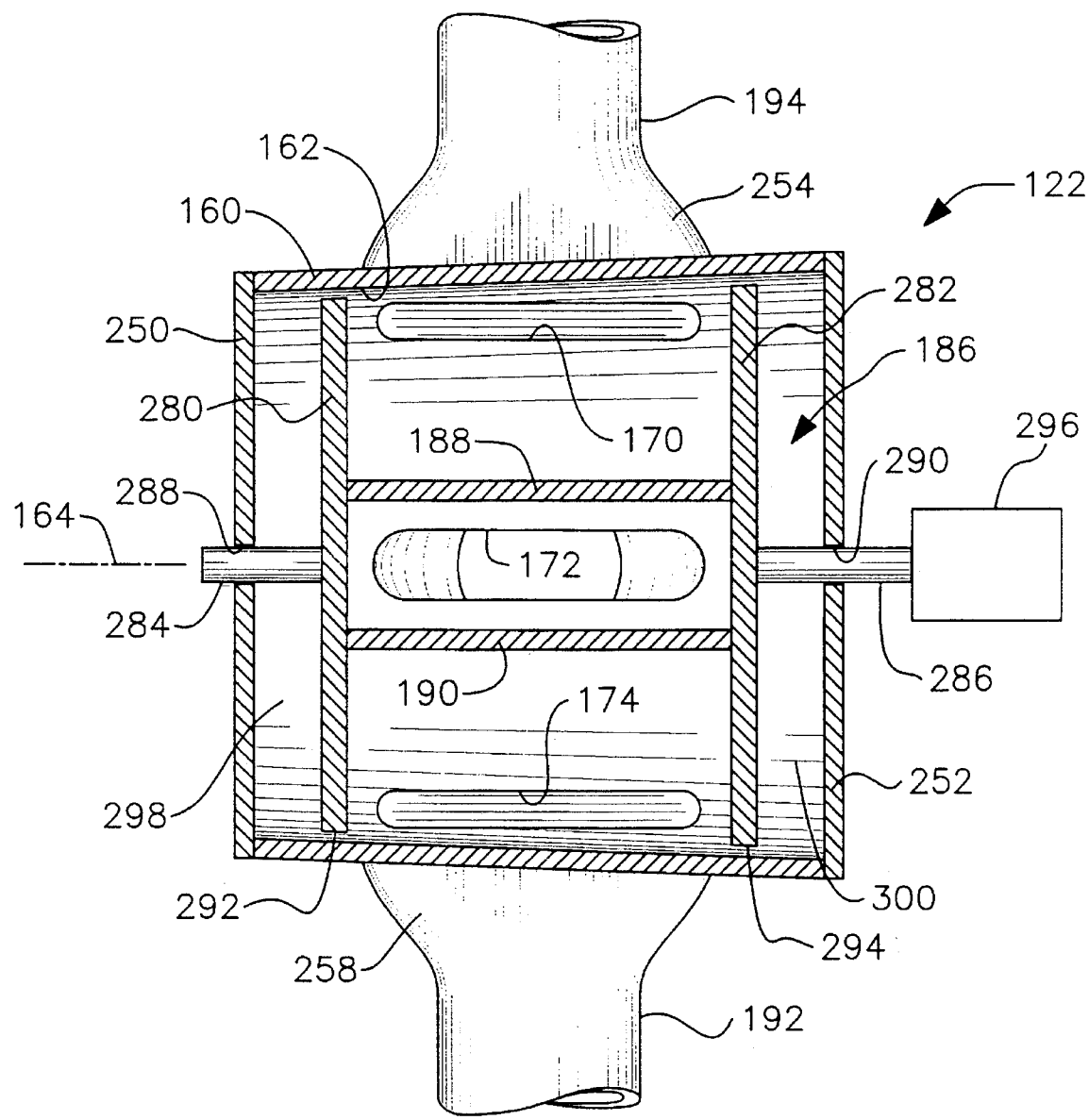
FIG. 7 is a view comparable to that of FIG. 5, depicting, in exaggerated form, a tapered cylindrical valve housing.

FIG. 7 represents another embodiment, which facilitates clearance adjustment. In FIG. 7, which is a slightly modified form of FIG. 5, the valve body 160, and more particularly the inner surface 162 thereof, rather than being truly cylindrical, comprises a tapered cylinder. The rotor end pieces 280 and 282 correspondingly have different diameters, and the generally parallel plates 188 and 190 are trapezoidal rather than rectangular. Clearance adjustment is effected by axial movement of the rotor 186 with reference to the valve housing 162. In FIG. 7, the taper is exaggerated for purposes of illustration. In a typical valve having a diameter of approximately eight feet and an axial length of approximately eight feet, the difference in diameter from one end to the other is approximately two inches.

One deficiency in the valve of FIGS. 4 and 5 is that valve leakage can occur through the valve due to the requirement to provide some clearance in a rotary valve, particularly in view of the relatively large size of valves for regenerative incinerators and the high temperatures involved, with resultant thermal expansion. Thus, for example, in the valve orientation of FIG. 4, leakage around edge 268 of the parallel plate 188 can allow a small amount of feed gas to pass from opening 172 into the spaces above parallel plate 188 and then through opening 180 into the treated gas stream. Such leakage gas flow entirely bypasses the combustion chamber 130, resulting in some contamination of the treated gas output.

Figure 8:
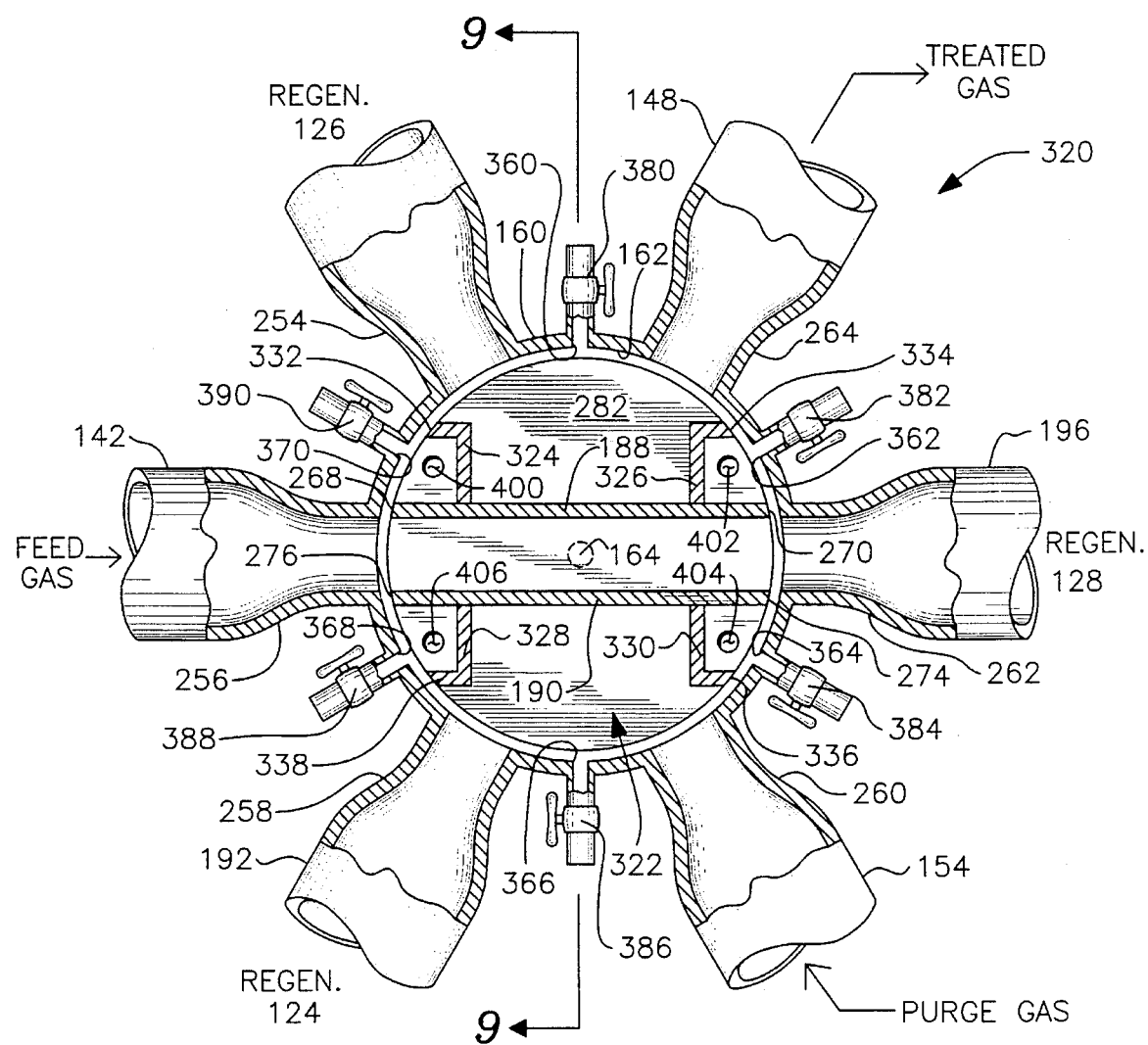
FIG. 8 is a view similar to that of FIG. 4, depicting a valve embodiment including plenum-defining structure.
Figure 9:
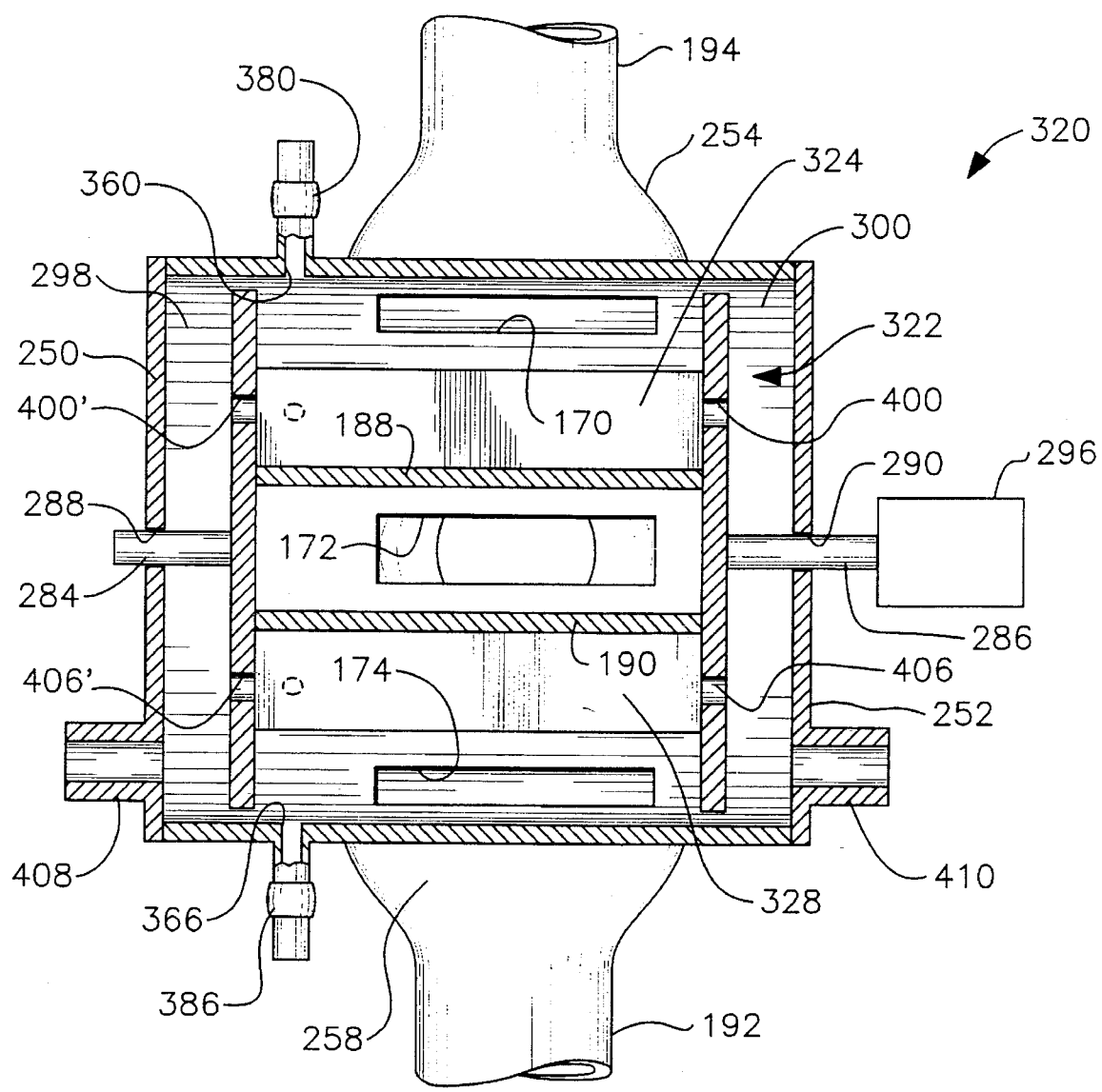
FIG. 9 is a section taken on line 9—9 of FIG. 8.

To prevent this, a modified valve 320 depicted in FIGS. 8 and 9, with a modified valve rotor 322 (FIG. 10) includes a plenum-defining structure illustrated for purposes of example as flange-like elements 324, 326, 328 and 330 connected to the generally parallel plates 188 and 190. The plenum-defining structures 324, 326, 328 and 330 have respective edges 332, 334, 336 and 338 which are angularly spaced from corresponding radially outer edges 268, 270, 274 and 276 of the parallel plates 188 and 190.

The thus-defined plenums are either pressurized at least to a pressure higher than that of the untreated feed gas within line or conduit 142, or vented to a pressure lower than any other pressure in the system. For example, when the plenums are pressurized, such as being connected to a purge gas line 154, or another source of treated or pure gas under pressure, all leakage within the valve is of the purge gas. Thus, the expected leakage through the clearance is seal gas leaking into the feed gas, preventing impure feed gas from leaking into the treated gas flow. Some pure seal gas also leaks into the treated gas flow, but this causes no harm.

Instead of pressurized seal gas, it will be appreciated that the plenums can be maintained at a pressure well below the pressure of the treated gas. In this case, seal gas is withdrawn from the valve, and the seal gas contains leakage from both feed gas and the treated gas streams. The then contaminated seal gas is treated, such as by pumping into the impure feed gas stream at the inlet 140.

Figure 10:
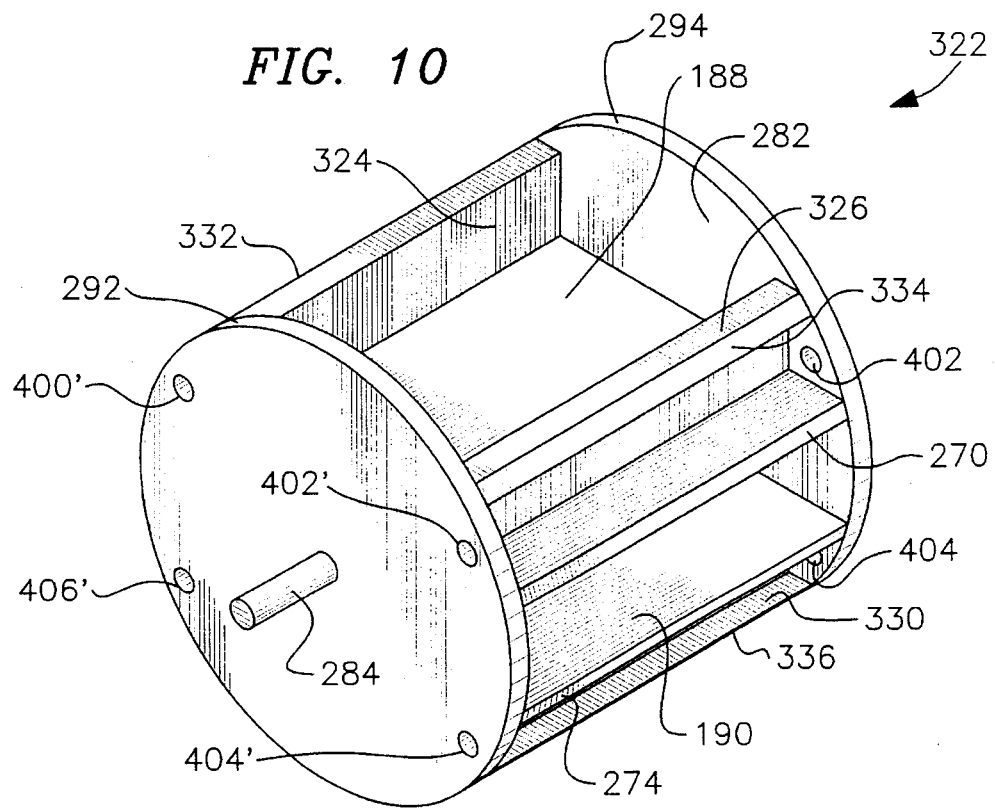
FIG. 10 is a three-dimensional view of the rotor of the valve of FIGS. 8 and 9.

For either pressurizing or venting the plenums, a minor conduit is provided. FIGS. 8–10 illustrate two alternative forms of minor conduits. While both alternatives are shown in FIGS. 8–10, it will be appreciated that in an actual embodiment only one is employed.

As the first alternative, apertures 360, 362, 364, 366, 368 and 370 are provided in the valve body 160, with corresponding control valves 380, 382, 284, 386, 388 and 390 automatically operated to pressurize the plenum chambers.

As the second alternative, apertures 400, 402, 404, 406, 400', 404' and 406' are formed in the rotor circular end pieces 280 and 282, establishing a fluid flow path between the plenums and the internal end chambers 298 and 300. Additionally, suitable conduits 408 and 410 are provided to either pressurize the end chambers 298 and 300 with pure seal gas or evacuate the end chambers 298 and 300.

As a minor variation, best seen in FIG. 9, the valve 320 of FIGS. 8 and 9 differs slightly from the valve of FIGS. 4 and 5 in that the main conduit connection openings 170, 172, 174, 176, 178 and 180 are rectangular, rather than oblong.

Another disadvantage of the valve of FIGS. 4 and 5 is that, when the rotor 186 is in the process of moving from one valve position to another, there is a short interval, perhaps one second, when impure feed gas can bypass the edges of the plates 188 and 190 and flow directly into the treated gas conduit 148. One intermediate valve rotor position is depicted in FIG. 11.

Figure 11:
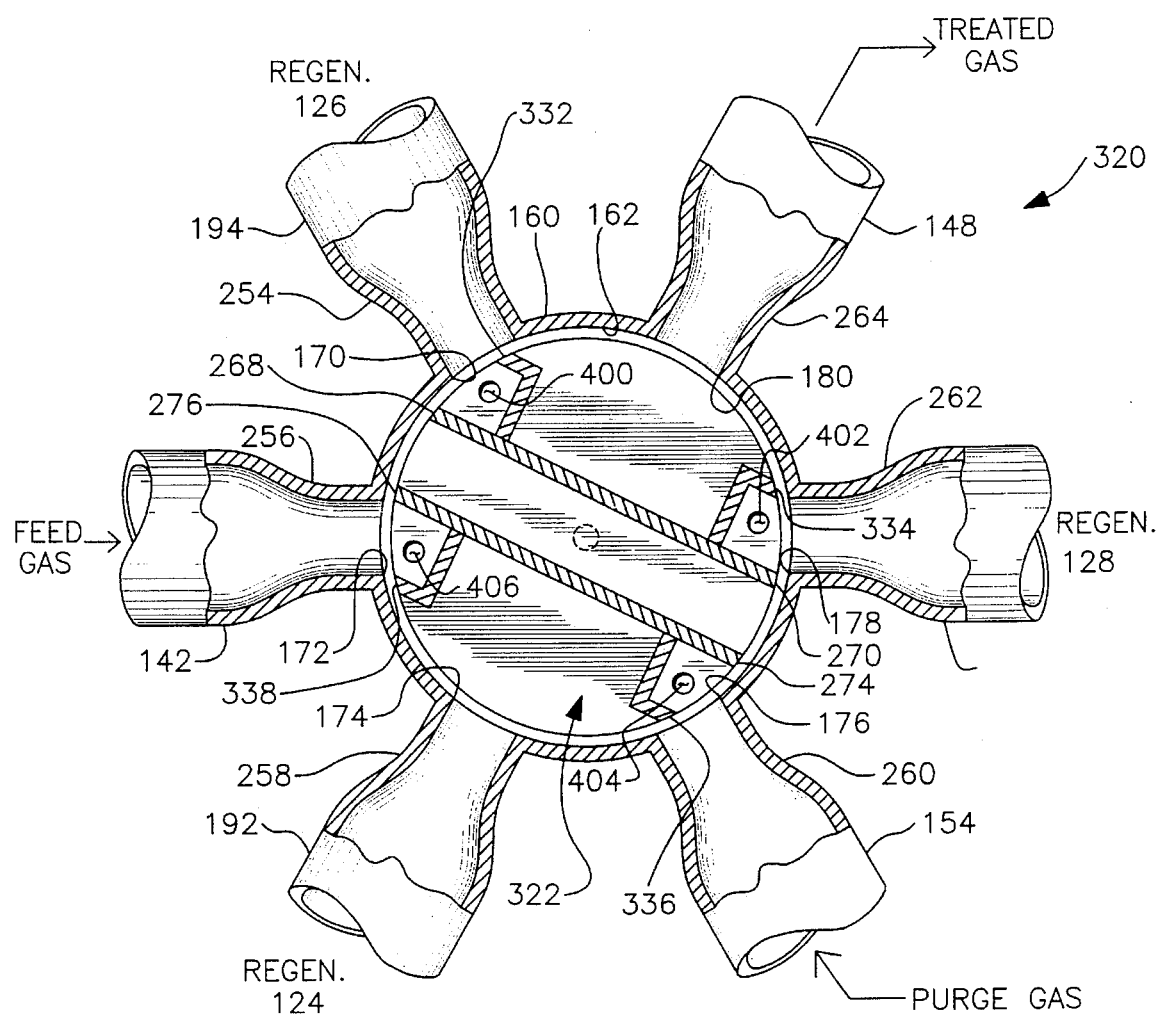
FIG. 11 depicts the valve of FIGS. 8 and 9 with the rotor in an intermediate position.

Preferably, as may be seen in FIG. 11, the edges 332, 334, 336 and 338 of the plenum-defining structure are radially spaced from the edges 268, 270, 274 and 276 of the parallel plates sufficient to span the openings 170, 172, 174, 176, 178 and 180 when the valve rotor 322 is in a position intermediate the valve positions, normally when the rotor 322 is turning. In this way, even momentary undesirable leakage through the valve 320 is prevented at all times during operation.

Figure 12:
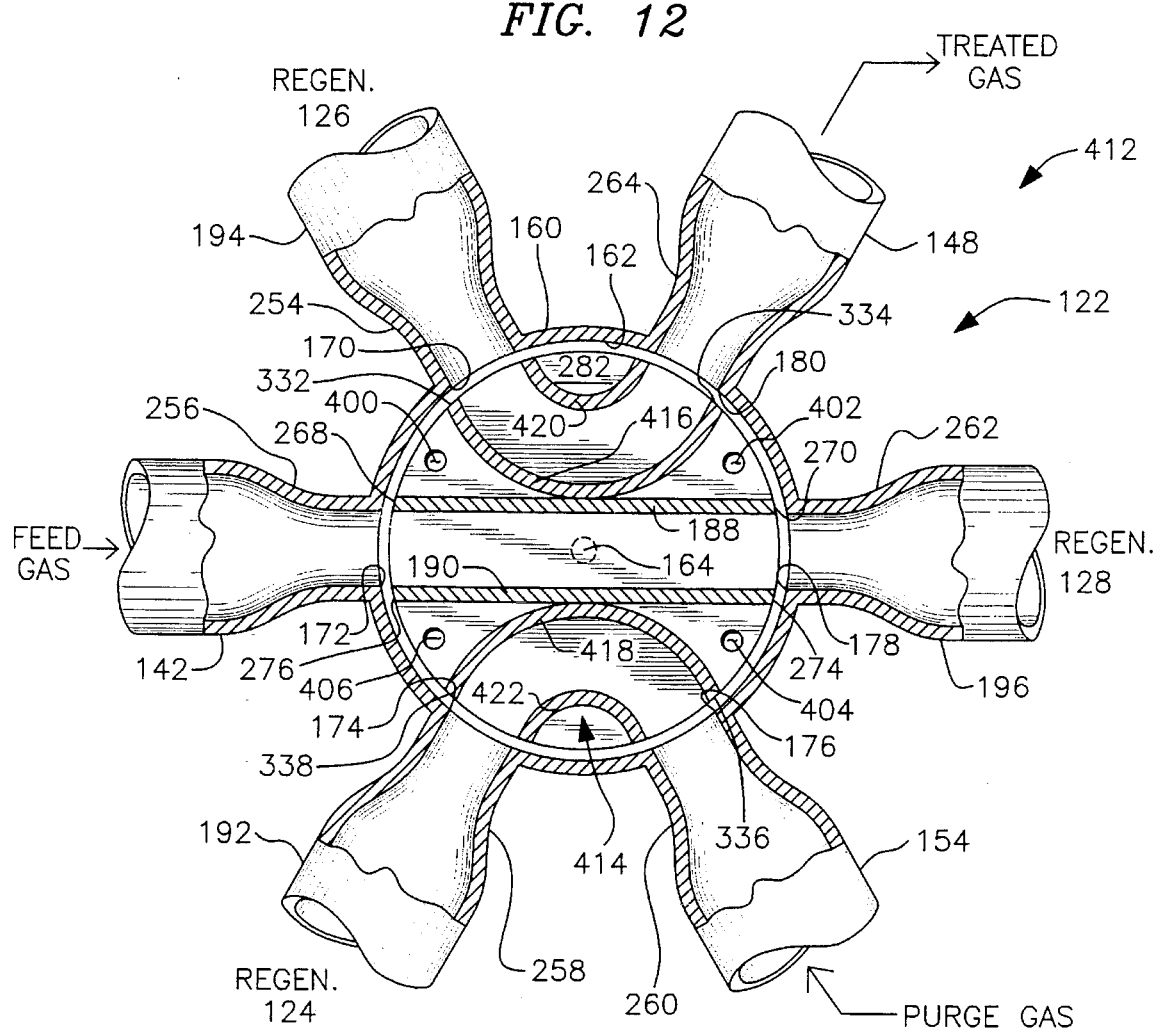
FIG. 12 is a sectional view similar to that of FIG. 8 depicting another form of plenum-defining structure.

FIG. 12 depict a modification of the valve 320 of FIG. 8 which minimizes pressure drop. In FIG. 12, a valve 412 includes a rotor 414 wherein the right-angle flange-like structures 324, 326, 328 and 330 of FIG. 8 are replaced by curved pieces 416 and 418, terminating in the same edges 332, 334, 336 and 338 as in FIG. 8. Guide vanes 420 and 422 may also be employed, extending between the rotor circular end pieces 280 and 282.

Referring finally to FIGS. 13 and 14, a suitable form of indexing mechanism 296 is shown.

Connected to the axle 286 so as to drive the rotor 186, 322 or 414 in rotation is an indexing wheel 430 which has a set of six equally angularly spaced detents 432, 434, 436, 438, 440 and 442 (FIG. 13), each with an engagement surface 444, a detent slot 446, a drive slot 448, and a drive guide surface 450 (FIG. 14). A retaining arm 454 which pivots at 456 has an appropriately-configured end piece 458 urged by a spring 460 into a detent such as the detent 432 in FIG. 14, to hold the rotor 186, 322 or 414 in a position. The end piece 458 has a retaining surface 460 which engages the detent surface 444, and a cam follower surface 462, a portion of which can engage the detent slot 446 to hold the wheel 430 and thus the rotor 186, 322 or 414 in one of the valve positions.

For advancing the rotor position 60° at a time to effect successive operational cycles, a pneumatically operated air cylinder 466 having a piston 468 driving an actuator rod 470 and an appropriately-configured end block 472 is provided. The end block 472 has tapered surfaces 474 and 476 which slide between cam follower surface 462 and drive guide surface 450 to move the arm 454 upward against force of the spring 460. The end block 472 then pushes against the wheel 430, as a nib 478 on the end block 472 engages drive slot 448. This rotates the wheel 430 by 60° to the next valve position. Piston 468 and rod 472 are then withdrawn, and the spring 460 urges the arm 454 into the next detent on the wheel 430 to hold the rotor 186, 322 or 414 steady.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A rotary fluid control valve comprising:

a valve body with a central axis, said valve body having an inner surface defined as a surface of revolution of line about the axis, and six main conduit connection openings at substantially equal angular intervals about the central axis, said openings having an angular extent;

a valve rotor within said valve body, said valve rotor including a pair of parallel plates spaced apart a distance at least sufficient to span the angular extent of said openings and supported substantially equidistant from the central axis for rotation on the central axis between at least three valve positions, said parallel plates having radially outer edges that are adjacent said inner surface in any one of the valve positions, and said valve rotor further including structure cooperating with portions of said valve body inner surface and with at least portions of the outside surfaces of said plates to define at least one plenum when said valve rotor is in any of the valve positions, said structure having edges adjacent said inner surface angularly spaced from said radially outer edges of said parallel plates; and a minor conduit in fluid communication with said at least one plenum;

said parallel plates, when said valve rotor is in any of the valve positions, defining a first path between said plates for deliberate fluid communication between two diametrically opposed main conduit connection openings, a second path on the outside of one of said plates for deliberate fluid communication between two adjacent main conduit connection openings, and a third path on the outside of the other one of said plates for deliberate fluid communication between another two adjacent main conduit connection openings.

2. A valve in accordance with claim 1, wherein said valve body inner surface is cylindrical.

3. A valve in accordance with claim 2, wherein said valve body inner surface is a tapered cylinder.

4. A valve in accordance with claim 1, wherein said edges of said structure are angularly spaced from said radially outer edges of said parallel plates a distance sufficient to span an adjacent one of said openings when said valve rotor is in a position intermediate the valve positions.

5. A valve in accordance with claim 4, wherein said main conduit connection openings are spaced from each other an angular distance at least as great as the angular extent of said main conduit connection openings.

6. A valve in accordance with claim 1, wherein said conduit connection openings are oblong.

7. A valve in accordance with claim 1, wherein said conduit connection openings are rectangular.

8. A valve in accordance with claim 1, wherein said structure cooperating with the outside surfaces of said plates comprises curved plates for guiding fluid, flow smoothly through said valve along the second and third paths.

9. A valve in accordance with claim 1, wherein said minor conduit and thus the plenums are pressurized to a pressure higher than the pressure in any of the main conduit connection openings to prevent leakage between any of the main conduit connection openings that are not in deliberate fluid communication.

10. A valve in accordance with claim 1, wherein said minor conduit and thus the plenums are vented to a pressure lower than the pressure in any of the main conduit connection openings to prevent leakage between any of the main conduit connection openings that are not in deliberate fluid communication.

11. A valve in accordance with claim 1, wherein said minor conduit comprises an aperture in said valve body.

12. A rotary fluid control valve comprising:
a valve body with a central axis, said valve body having a pair of end walls spaced apart on and perpendicular to the central axis, a cylindrical inner surface extending between said end walls about the central axis, and six main conduit connection openings through said cylindrical inner surface at substantially equal angular intervals about the control axis, said openings having an angular extent;
a valve rotor within said valve body, said valve rotor including a pair of circular end pieces centered and mounted for rotation on the central axis between at least three valve positions, said circular end pieces being oriented perpendicularly to the central axis with the peripheries thereof adjacent said inner surface, and axially spaced from respective ones of said end walls to define internal end chambers, and said valve rotor further including a pair of generally parallel plates extending between said end pieces, said generally parallel plates being spaced apart a distance at least sufficient to span the angular extent of said openings and supported by said end pieces substantially equidistant from the central axis for rotation on the central axis between the valve positions, said parallel plates having radially outer edges that are adjacent said inner surface in any one of the valve positions, and said valve rotor further including structure cooperating with portions of said valve body inner surface and with at least portions of the outside surfaces of said plates to define at least one plenum when said valve rotor is in any of the valve positions, said structure having edges adjacent said inner surface angularly spaced from said radially outer edges of said parallel plates; and
a minor conduit in fluid communication with said at least one plenum;
said parallel plates, when said valve rotor is in any of the valve positions, defining a first path between said plates for deliberate fluid communication between two diametrically opposed main conduit connection openings, a second path on the outside of one of said plates for deliberate fluid communication between two adjacent main conduit connection openings, and a third path on the outside of the other one of said plates for deliberate fluid communication between another two adjacent main conduit connection openings.

13. A valve in accordance with claim 12, wherein said valve body inner surface is a tapered cylinder, said circular end pieces have different diameters, and said parallel plates are trapezoidal.

14. A valve in accordance with claim 12, wherein said edges of said structure are angularly spaced from said radially outer edges of said parallel plates a distance sufficient to span an adjacent one of said openings when said valve rotor is in a position intermediate the valve positions.

15. A valve in accordance with claim 14, wherein said main conduit connection openings are spaced from each other an angular distance at least as great as the angular extent of said main conduit connection openings.

16. A valve in accordance with claim 12, wherein said minor conduit comprises an aperture in at least one of said circular end pieces between said plenum and the corresponding internal end chamber.

17. A valve in accordance with claim 12, wherein said structure cooperating with the outside surfaces of said plates comprises curved plates for guiding fluid flow smoothly through said valve along the second and third paths.

18. A thermal regenerative fume incinerator system comprising:
an inlet for untreated gas;
an outlet for treated gas;
a source of purge gas;
three thermal regenerators for alternately receiving heat from a gas flow passing through the regenerator in one direction and transferring heat to a gas flow passing through the regenerator in the opposite direction;
a combustion chamber common to all three regenerators and connected to a first end of each of said regenerators for receiving a preheated gas flow passing through one of said regenerators, oxidizing contaminants in the preheated gas flow, and discharging hot gas through another one of said regenerators; and
a rotary fluid control valve including:
a valve body with a central axis, said valve body having an inner surface defined as a surface of revolution of a line about the axis, and six main conduit connection openings at substantially equal angular intervals about the central axis, said openings having an angular extent, and said openings being organized as three regenerator connection openings and three interspersed functional connection openings,
a valve rotor within said valve body, said valve rotor including a pair of parallel plates spaced apart a distance at least sufficient to span the angular extent of said openings and supported substantially equidistant from the central axis for rotation on the central axis between at least three valve positions, said parallel plates having radially outer edges that are adjacent said inner surface in any one of the valve positions, and said valve rotor further including structure cooperating with portions of said valve body inner surface and with at least portions of the outside surfaces of said plates to define at least one plenum when said valve rotor is in any of the valve positions, said structure having edges adjacent said inner surface angularly spaced from said radially outer edges of said parallel plates, and
a minor conduit in fluid communication with said at least one plenum,
said parallel plates, when said valve rotor is in any of the valve positions, defining a first path between said plates for deliberate fluid communication between two diametrically opposed main conduit connection openings, a second path on the outside of one of said plates for deliberate fluid communication between two adjacent main conduit connection openings, and a third path on the outside of the other one of said plates for deliberate fluid communication between another two adjacent main conduit connection openings;
second ends of each of said regenerators being connected to respective ones of said regenerator connection openings;
said inlet being connected to one of said functional connection openings, said outlet being connected to another one of said functional connection openings, and said source of purge gas being connected to yet another one of said functional connection openings.

19. A fume incinerator system in accordance with claim 18, wherein the edges of said valve rotor structure are angularly spaced from said radially outer edges of said parallel plates a distance sufficient to span an adjacent one of said openings when said valve rotor is in a position intermediate the valve positions.

* * * * *